(12) United States Patent
Simboli (10) Patent No.: US 6,733,040 B1
(45) Date of Patent: May 11, 2004

(54) CLOSED CHANNEL STRUCTURAL MEMBER HAVING INTERNAL REINFORCEMENT FOR VEHICLE BODY AND FRAME ASSEMBLY

(75) Inventor: Andrew R. Simboli, Coatesville, PA (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/189,299

(22) Filed: Jul. 2, 2002

(51) Int. Cl.[7] .............................................. B62D 21/06
(52) U.S. Cl. ...................... 280/800; 280/797; 280/784; 296/187.02
(58) Field of Search ................................ 280/800, 797, 280/784; 296/187.02

(56) References Cited

U.S. PATENT DOCUMENTS

| | | | |
|---|---|---|---|
| 1,848,895 A | * 3/1932 | MacPherson | ............... 280/800 |
| 2,105,713 A | 1/1938 | Werdehoff | |
| 2,136,122 A | 11/1938 | Almdale | |
| 2,297,123 A | 9/1942 | Almdale | |
| 3,098,656 A | 7/1963 | Gregory | |
| 3,188,110 A | * 6/1965 | Wessells | ..................... 280/781 |
| 3,827,712 A | * 8/1974 | Suzuki et al. | ............... 280/784 |
| 4,674,770 A | 6/1987 | Inagaki | |
| 4,726,166 A | * 2/1988 | DeRees | ........................ 52/694 |
| 5,507,522 A | 4/1996 | Ritchie | |
| 5,755,486 A | * 5/1998 | Wycech | .................. 296/187.02 |
| 5,992,923 A | * 11/1999 | Wycech | .................. 296/187.02 |
| 6,099,194 A | * 8/2000 | Durand | ....................... 403/270 |
| 6,270,600 B1 | * 8/2001 | Wycech | ....................... 156/79 |
| 6,455,126 B1 | * 9/2002 | Wycech | ....................... 428/122 |

FOREIGN PATENT DOCUMENTS

| | | |
|---|---|---|
| DE | 197 30 395 | 7/1997 |
| GB | 2292716 | 3/1996 |
| GB | 2341149 | 3/2000 |

* cited by examiner

Primary Examiner—Michael J. Carone
Assistant Examiner—M. Thomson
(74) Attorney, Agent, or Firm—MacMillan, Sobanski & Todd, LLC (57) ABSTRACT

A closed channel structural member, such as a side rail or a cross member, for use in such a vehicle body and frame assembly that includes an internal reinforcing structure to increase the strength and rigidity thereof. The side rail can be generally rectangular in cross sectional shape, including first and second side rail sections having generally C-shaped cross sectional shapes. The reinforcing structure can be generally hat-shaped or W-shaped in cross sectional shape, including a central reinforcing portion extending between a pair of base portions. The central reinforcing portion can either be laterally spaced apart from or directly abut a central web portion of one of the side rail sections. The base portions can be generally L-shaped in cross sectional shape, including legs that terminate adjacent to the ends of the other of the side rail sections to facilitate the assembly process. A pair of such reinforcing structures can be disposed within the side rail and abut one another in end-to-end fashion. Alternatively, tabs extending from each of the reinforcing structures can is partially overlap one another to provide additional strength and rigidity.

19 Claims, 5 Drawing Sheets

CLOSED CHANNEL STRUCTURAL MEMBER HAVING INTERNAL REINFORCEMENT FOR VEHICLE BODY AND FRAME ASSEMBLY

BACKGROUND OF THE INVENTION

This invention relates in general to body and frame assemblies for vehicles. More specifically, this invention relates to an improved structure for a closed channel structural member, such as a side rail or a cross member, for use in such a vehicle body and frame assembly that includes an internal reinforcing structure to increase the strength and rigidity thereof.

Many land vehicles in common use, such as automobiles, vans, and trucks, include a body and frame assembly that is supported upon a plurality of groundengaging wheels by a resilient suspension system. The structures of known body and frame assemblies can be divided into two general categories, namely, separate and unitized. In a typical separate body and frame assembly, the structural components of the body portion and the frame portion of the vehicle are separate and independent from one another. When assembled, the frame portion of the assembly is resiliently supported upon the vehicle wheels by the suspension system and serves as a platform upon which the body portion of the assembly and other components of the vehicle can be mounted. Separate body and frame assemblies of this general type are found in most older vehicles, but remain in common use today for many relatively large or specialized use modern vehicles, such as large vans, sport utility vehicles, and trucks. In a typical unitized body and frame assembly, the structural components of the body portion and the frame portion are combined into an integral unit that is resiliently supported upon the vehicle wheels by the suspension system. Unitized body and frame assemblies of this general type are found in many relatively small modern vehicles, such as automobiles and minivans.

Traditionally, the various components of vehicular body and frame assemblies have been formed from open channel structural members, i.e., structural members that have a non-continuous cross sectional shape (such as U-shaped or C-shaped channel members, for example). For example, it is known to use one or more open channel structural members to form the side rails, the cross members, and other components of a ladder frame type of separate body and frame assembly. However, the use of open channel structural members to form the various components of vehicular body and frame assemblies has been found to be undesirable for several reasons. To address this, it has been proposed to form one or more of the components of the vehicular body and frame assemblies from closed channel structural members, i.e., structural members that have a continuous cross sectional shape (such as tubular or box-shaped channel members, for example). This cross sectional shape is advantageous because it provides strength and rigidity to the vehicle body and frame component. Also, closed channel structural member are well suited to be deformed to a desired shape by hydroforming, which is a well known process that uses pressurized fluid supplied within the closed channel structural member to deform it into conformance with a surrounding die. Hydroforming has been found to be a desirable forming process because portions of a closed channel structural member can be quickly and easily deformed to have a complex cross sectional shape.

Although closed channel structural members provide strength and rigidity to the vehicle body and frame component, there are instances where it is necessary or desirable to further increase the strength and rigidity thereof. For example, it may be necessary or desirable to reinforce the strength of a closed channel structural member at one or more locations throughout the length thereof to prevent deformation under extreme operating conditions, such as during a collision. Also, it may be desirable to reinforce the strength of a closed: channel structural member at one or more locations throughout the length thereof where mounting brackets or other ancillary components are secured thereto. Because of their inherent closed cross sectional shapes, however, it has been found to be difficult to provide such reinforcement in closed channel structural members, particularly without changing the shape of outer surface thereof. Thus, it would be desirable to provide an improved structure for a closed channel structural member, such as a side rail or a cross member, for use in a vehicle body and frame assembly, that includes an internal reinforcing structure to increase the strength and rigidity thereof.

SUMMARY OF THE INVENTION

This invention relates to an improved structure for a closed channel structural member, such as a side rail or a cross member, for use in such a vehicle body and frame assembly that includes an internal reinforcing structure to increase the strength and rigidity thereof. The side rail can be generally rectangular in cross sectional shape, including first and second side rail sections having generally C-shaped cross sectional shapes. The reinforcing structure can be generally hat-shaped or W-shaped in cross sectional shape, including a central reinforcing portion extending between a pair of base portions. The central reinforcing portion can either be laterally spaced apart from or directly abut a central web portion of one of the side rail sections. The base portions can be generally L-shaped in cross sectional shape, including legs that terminate adjacent to the ends of the other of the side rail sections to facilitate the assembly process. A pair of such,reinforcing structures can be disposed within the side rail and abut one another in end-to-end fashion. Alternatively, tabs extending from each of the reinforcing structures can partially overlap one another to provide additional strength and rigidity.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
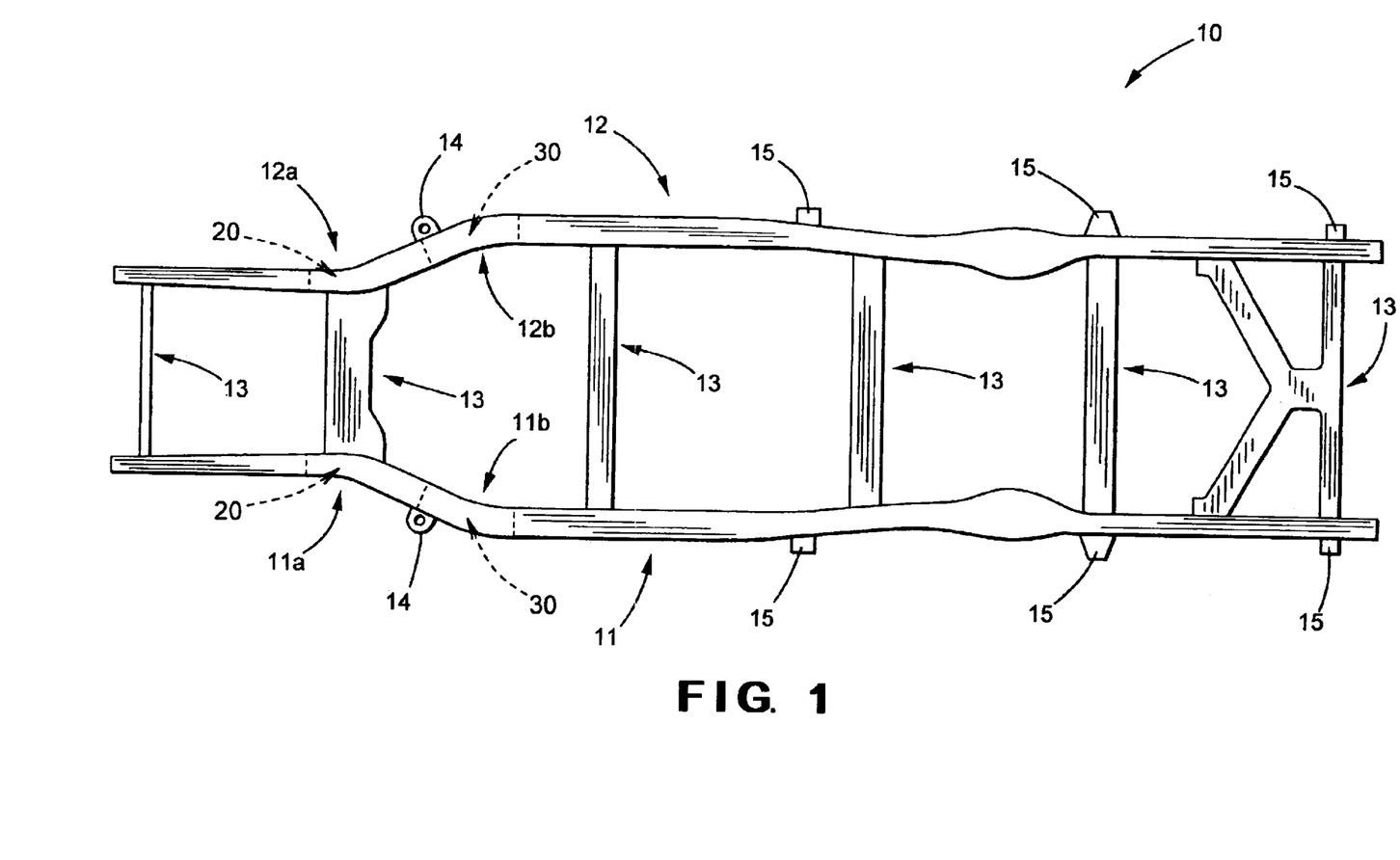
FIG. 1 is a top plan view of a frame assembly for a vehicle including a pair of closed channel structural members having a first embodiment of an internal reinforcing structure provided therein in accordance with this invention.

Referring now to the drawings, there is illustrated in FIG. 1 a portion of a first embodiment of a vehicle frame assembly, indicated generally at 10, in accordance with this invention. The vehicle frame assembly 10 is generally conventional in the art, and only those portions thereof that are necessary for a complete understanding of this invention will be described and illustrated. Furthermore, it will be appreciated that the illustrated vehicle frame assembly 10 is intended to be representative of any conventional structure, separate or unitized, for a frame assembly for use in a vehicle.

The illustrated vehicle frame assembly 10 is a ladder frame assembly including a pair of longitudinally extending side rails, indicated generally at 11 and 12, or similar structural members having a plurality of transverse cross members, indicated generally at 13, or similar structural members extending therebetween. The side rails 11 and 12 extend longitudinally throughout the entire length of the assembly 10 and are generally parallel to one another. Each of the side rails 11 and 12 in the illustrated embodiment is formed from a single closed channel structural member, the specific structure of which will be described in detail below. However, it will be appreciated that one or both of the side rails 11 and 12 may be formed from a plurality of individual closed channel structural members that are secured together by any conventional means, such as by welding, riveting, bolting, and the like.

The cross members 13 extend generally perpendicularly to the side rails 11 and 12 and may be formed having any conventional structure. The cross members 13 are spaced apart from one another along the length of the ladder frame assembly 10 and can be secured to the side rails 11 and 12 by any conventional means, such as by welding, riveting, bolting, and the like. When secured to the side rails 11 and 12, the cross members 13 provide desirable lateral and torsional rigidity to the ladder frame assembly 10. A plurality of front body mount brackets, such as shown at 14, can be secured to the side rails 11 and 12 to facilitate the facilitate the connection of a body portion (not shown) of the vehicle to the vehicle frame assembly 10. Other mounting brackets, such as shown at 15, may also be secured to the side rails 11 and 12 to facilitate the facilitate the connection of the body portion and other components of the vehicle to the vehicle frame assembly 10. The structure of the vehicle frame assembly 10 thus far described is conventional in the art.

As best shown in FIG. 1, the illustrated side rails 11 and 12 are formed having first laterally curved portions, indicated respectively at 11a and 12a, and second laterally curved portions, indicated generally at 11b and 12b. Such laterally curved portions 11a, 11b and 12a, 12b provide the vehicle frame assembly 10 with a front end portion that is somewhat smaller in width than the remainder thereof. Such a reduced width front end portion may, for example, be used to form an engine cradle that is integral with the remainder of the vehicle frame assembly 10. It has been found that the laterally extending curved portions 11a, 11b and 12a, 12b can be undesirably deformed when the vehicle frame, assembly 10 is subjected to extreme operating conditions, such as during a collision. Thus, it would be desirable to provide a structure for reinforcing the strength and rigidity of the side rails 11 and 12 in these laterally extending curved portions 11a, 11b and 12a, 12b to prevent this undesirable deformation from occurring in those portions of the vehicle frame assembly 10. However, although this invention will be described in the context of reinforcing the illustrated reduced width front end portion of the vehicle frame assembly 10, it will be appreciated that this invention may be practiced with any other portion of the vehicle frame assembly 10.

Figure 2:
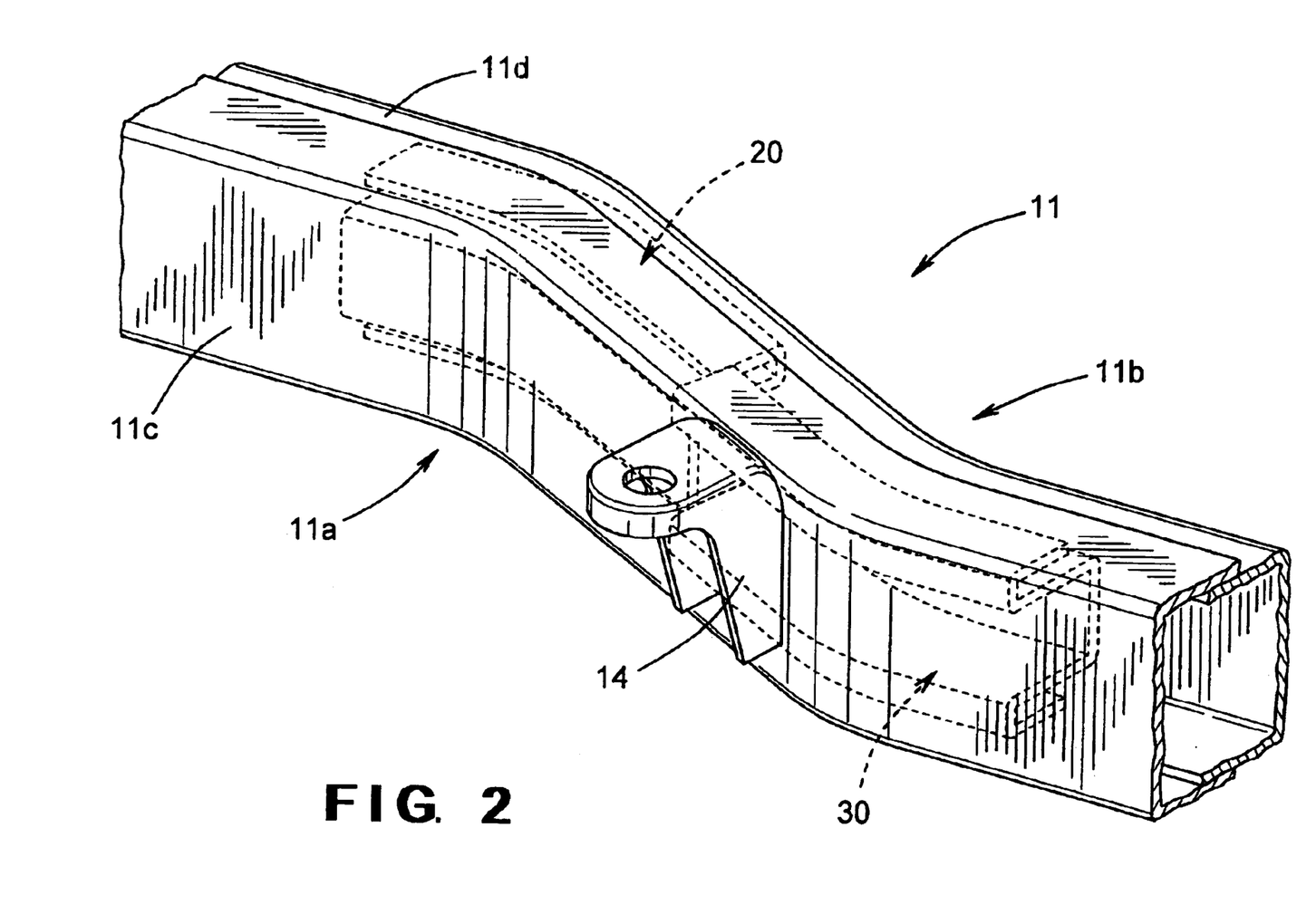
FIG. 2 is an enlarged perspective view of a portion of one of the closed channel structural members and the first embodiment of internal reinforcing structure illustrated in FIG. 1.
Figure 3:
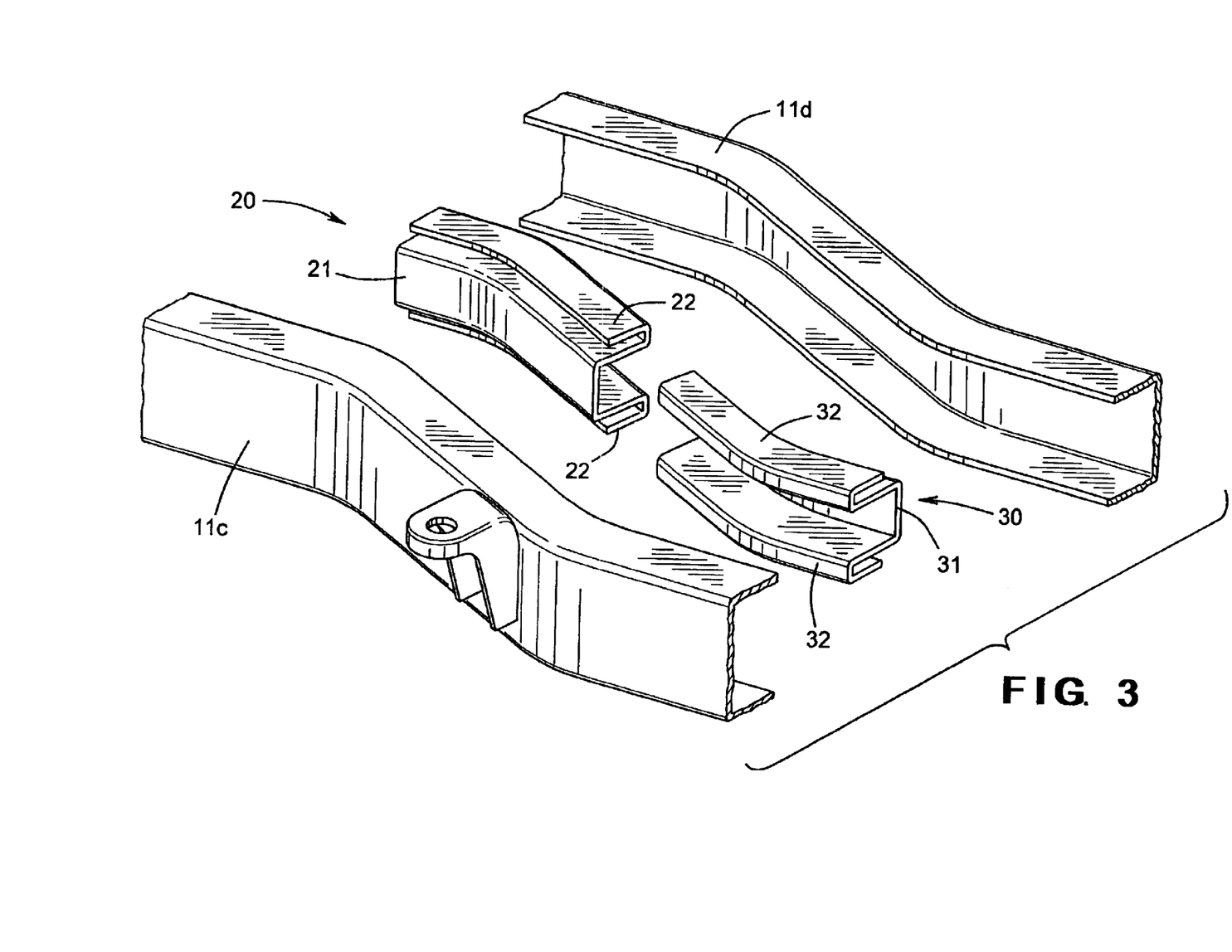
FIG. 3 is an enlarged exploded perspective view of the portion of the closed channel structural member and the first embodiment of the internal reinforcing structure illustrated in FIG. 2.
Figure 4:
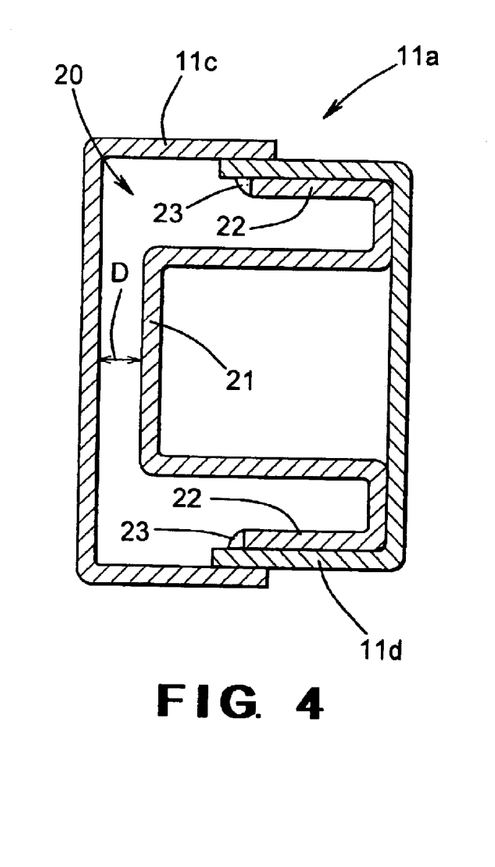
FIG. 4 is an enlarged sectional elevational view of the portion of the closed channel structural member and the first embodiment of the internal reinforcing structure illustrated in FIG. 3 shown assembled.

The structure of a portion of the side rail 11 is illustrated in detail in FIGS. 2, 3, and 4. Although this invention will be described and illustrated in context of the side rail 11, it will be appreciated that this invention may be practiced with any or all of the other structural members of the vehicle frame assembly 10 discussed above. The illustrated side rail 11 is generally rectangular in cross sectional shape and includes a first side rail section 11c and a second side rail section 11d. The illustrated first and second side rail sections 11c and: 11d both have a generally C-shaped cross sectional shape that is defined by a vertically extending central web portion extending between a pair of horizontally extending flange portions. However, the specific cross sectional shape of the side rail 11 can be varied as desired. The first and second side rail sections 11c and 11d are oriented with the open sides facing one another such that the respective flange portions partially overlap one another, as best shown in FIGS. 2 and 4. Such lateral overlapping allows such flange portions to be secured together in a conventional manner, such as by welding, to form the closed channel side rail 11.

A first reinforcing structure, indicated generally at 20, is disposed within the side rail 11 in the vicinity of the first laterally curved portion 11a. As best shown in FIG. 3, the first reinforcing structure 20 is laterally curved to conform at least generally to the first laterally curved portion 11a of the side rail 11. Similarly, a second reinforcing structure, indicated generally at 30, is disposed within the side rail 11 in the vicinity of the second laterally curved portion 11b. The second reinforcing structure 30 is also laterally curved to conform at least generally to the second laterally curved portion 11b of the side rail 11. As shown in FIG. 1, similar first and second reinforcing structures 20 and 30 can be disposed within the other side rail 12 in the vicinities of the first and second laterally curved portions 12a and 12b, respectively. In the illustrated embodiment, the: first and second reinforcing structures 20 and 30 abut one another in end-end fashion. However, a longitudinal gap of desired size may be provided between the first and second reinforcing structures 20 and 30.

The structure of the first reinforcing structure 20 is shown in detail in FIGS. 3 and 4. As shown therein, the first reinforcing structure 20 is generally hat-shaped in cross sectional shape, including a central reinforcing portion 21 extending between a pair of base portions 22. The illustrated central reinforcing portion 21 has a generally U-shaped cross sectional shape that is defined by a vertically extending central web portion extending between a pair of horizontally extending flange portions. The vertically extending central web portion of the central reinforcing portion 21 extends generally parallel to, but is laterally spaced apart from, the central web portion of the first side rail section 11c by a distance that is indicated at D in FIG. 4. Alternatively, however, for a purpose that will be explained, below, the vertically extending central web portion of the central reinforcing portion 21 can abut the central web portion of the first side rail section 11c (i.e., D equals zero). Each of the illustrated base portions 22 has a generally L-shaped cross sectional shape that is defined by a vertically extending leg portion and a horizontally extending leg portion. The vertically extending leg portions of the base portions 22 abut the central web portion of the second side rail section 11d, while the horizontally extending leg portions of the base portions 22 abut the horizontally extending flange portions of the second side rail section 11d. Preferably, the vertically extending leg portions of the base portions 22 are formed integrally with the horizontally extending flange portions of the central reinforcing portion 21 as shown, although such is not required.

The second reinforcing structure 30 can be shaped similarly to the first reinforcing structure 20, including a central reinforcing portion 31 extending between a pair of base portions 32. Thus, the illustrated central reinforcing portion 31 has a generally U-shaped cross sectional shape that is defined by a vertically extending central web portion extending between a pair of horizontally extending flange portions. The vertically extending central web portion of the central reinforcing portion 31 extends generally parallel to, but is laterally spaced apart from, the central web portion of second side rail section I Id. However, for a purpose that will be explained below, the vertically extending central web portion of the central reinforcing portion 31 can alternatively abut the central web portion of the first side rail section 11c. Each of the illustrated base portions 32 has a generally L-shaped cross sectional shape that is defined by a vertically extending leg portion and a horizontally extending leg portion. The vertically extending leg portions of the base portions 32 abut the central web portion of the first side rail section 11c, while the horizontally extending leg portions of the base portions 32 abut the horizontally extending flange portions of the first side rail section 11c. Preferably, the vertically extending leg portions of the base portions 32 are formed integrally with the horizontally extending flange portions of the central reinforcing portion 31 as shown, although such is not required. If desired, however, the second reinforcing structure 30 can have a different shape than the first reinforcing structure 20.

Preferably, the horizontally extending leg portions of the base portions 22 terminate adjacent to or near the ends of the respective horizontally extending flange portions of the side rail section 11d. Such orientation facilitates the manufacture of the reinforcing structures 20 and 30 with the side rail 11. During such manufacture, the side rail sections 11c and 11d are initially formed, as are the first and second reinforcing structures 20 and 30. The first reinforcing structure 20 is disposed within the side rail section 11d in the vicinity of the first laterally curved portion 11a, as shown in FIG. 4. Then, the ends of the horizontally extending leg portions of the base portions 22 can be positively secured to the ends of the respective horizontally extending flange portions of the side rail section 11d in a conventional manner, such as by a pair of welds 23. Similarly, the second reinforcing structure 30 is disposed within the side rail section 11c in the vicinity of the second laterally curved portion 11b. Then, the ends of the horizontally extending leg portions of the base portions 32 are positively secured to the ends of the respective horizontally extending flange portions of the side rail section 11c in a conventional manner, such as by a pair of welds (not shown). To complete the side rail 11, the side rail sections 11c and 11d are moved together such that the respective horizontally extending flange portions overlap one another, allowing such flange portions to be secured together as described above.

The first and second reinforcing structures 20 and 30 provide localized additional strength and rigidity to the side rails 11 and 12 in the regions of the laterally curved portions 11a, 11b and 12a, 12b. The amount of such additional strength and rigidity can be adjusted by varying the distance D between the vertically extending central web portion of the central reinforcing portion 21 of the first reinforcing structure 20 and the central web portion of the first side rail section 11c. If such distance D equals zero, then the reinforcing structure 20 provides maximum localized additional strength and rigidity to the side rail 11. If such distance D is greater than zero but relatively small, then the reinforcing structure 20 provides maximum localized additional strength and rigidity to the side rail 11 after the side rail 11 has been deformed by a relatively small amount. Similarly, if such distance D is relatively large, then the reinforcing structure 20 provides maximum localized additional strength and rigidity to the side rail 11 only after the side rail 11 has been deformed by a relatively large amount. Thus, the amounts of the additional strength and rigidity is provided by the reinforcing structures 20 and 30 can be customized as desired throughout the lengths of the side rails 11 and 12. Such localized reinforcements are desirable to prevent deformation of these laterally curved portions 11a, 11b and 12a, 12b under extreme operating conditions, such as during a collision. Also, such localized reinforcements are desirable to support the loads of the body portion of the vehicle that are applied to the frame portion 10 at the body mount brackets 14 or at other locations throughout the length of the side rails 11 and 12 where the other mounting brackets 15 are secured thereto.

Figure 5:
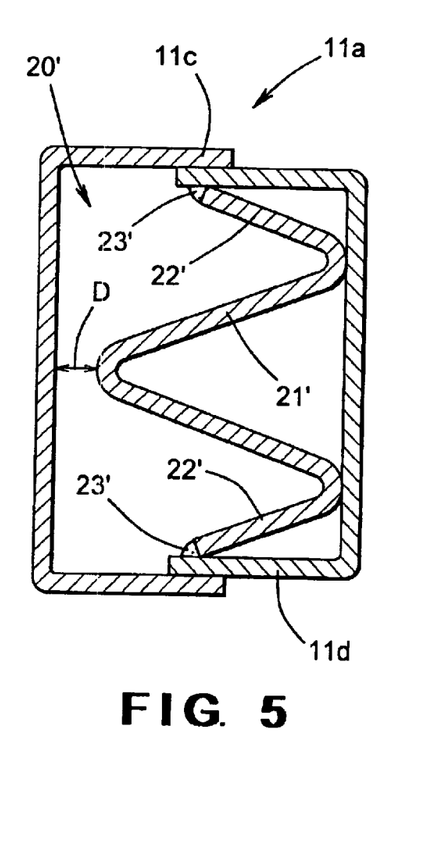
FIG. 5 is an enlarged sectional elevational view similar to FIG. 3 of the closed channel structural member and a second embodiment of the internal reinforcing structure in accordance with this invention.

FIG. 5 illustrates an alternative embodiment for the structure of the first reinforcing structure 20'. As shown therein, the modified first reinforcing structure 20' is generally W-shaped in cross sectional shape, including a central reinforcing portion 21' extending between a pair of base portions 22'. The illustrated central reinforcing portion 21 has a generally V-shaped cross sectional shape that is defined by a pair of diverging web portions extending between a pair of further diverging flange portions. The apex of the diverging web portions of the central reinforcing portion 21' is laterally spaced apart from the central web portion of the first side rail section 11c by a distance that is indicated at D in FIG. 5. Alternatively, however, for the same reason as discussed above, the apex of the diverging web portions of the central reinforcing portion 21' clan abut the central web portion of the first side rail section 11c (i.e., ID equals zero). Each of the further diverging base portions 22' terminates adjacent to or near the ends of the respective horizontally extending flange portions of the side rail section 11d and is secured thereto, such as by a weld 23'.

Figure 6:
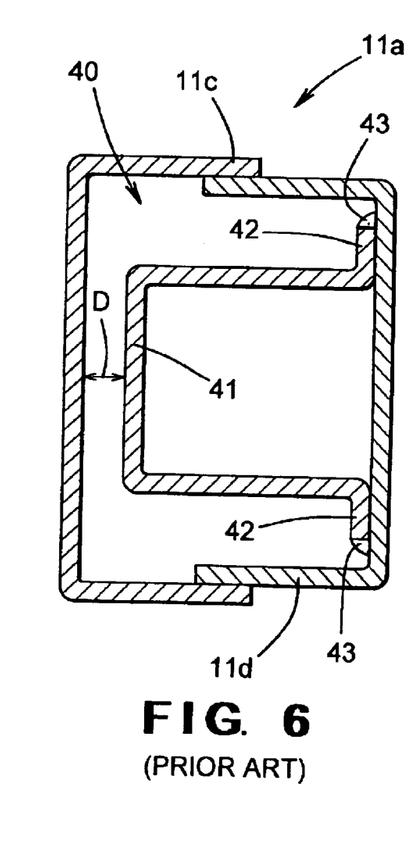
FIG. 6 is an enlarged sectional elevational view similar to FIG. 3 of the closed channel structural member and a prior art embodiment of an internal reinforcing structure.

FIG. 6 illustrates a prior art embodiment reinforcing structure 40. As shown therein, the prior art reinforcing structure 40 is generally hat-shaped in cross sectional shape, including a central reinforcing portion 41 extending between a pair of base portions 42. The central reinforcing portion 41 has a generally U-shaped cross sectional shape that is defined by a vertically extending central web portion extending between a pair of horizontally extending flange portions. The vertically extending central web portion of the central reinforcing portion 41 extends generally parallel to, but is laterally spaced apart from, the central web portion of the first side rail section 11c by a distance that is indicated at D in FIG. 6. Each of the illustrated base portions 42 is a vertically extending leg portion that abuts the central web portion of the second side rail section 11d. The vertically extending leg portions of the base portions 42 do not terminate adjacent to or near the ends of the respective horizontally extending flange portions of the side rail section 11d. Rather, such vertically extending leg portions of the base portions 42 terminate adjacent to or near the vertically extending central web portion of the second side rail section 11d and are secured thereto, such as by welds 43'. Such orientation unduly complicates the manufacture of the reinforcing structure 40 with the side rail 11, inasmuch as it is difficult to insert a welding tool (not shown) within the relatively small gap provided between the central reinforcing portion 41 of the prior art reinforcing structure 40 and the horizontally extending flange portions of the side rail 11c to create the welds 43.

Figure 7:
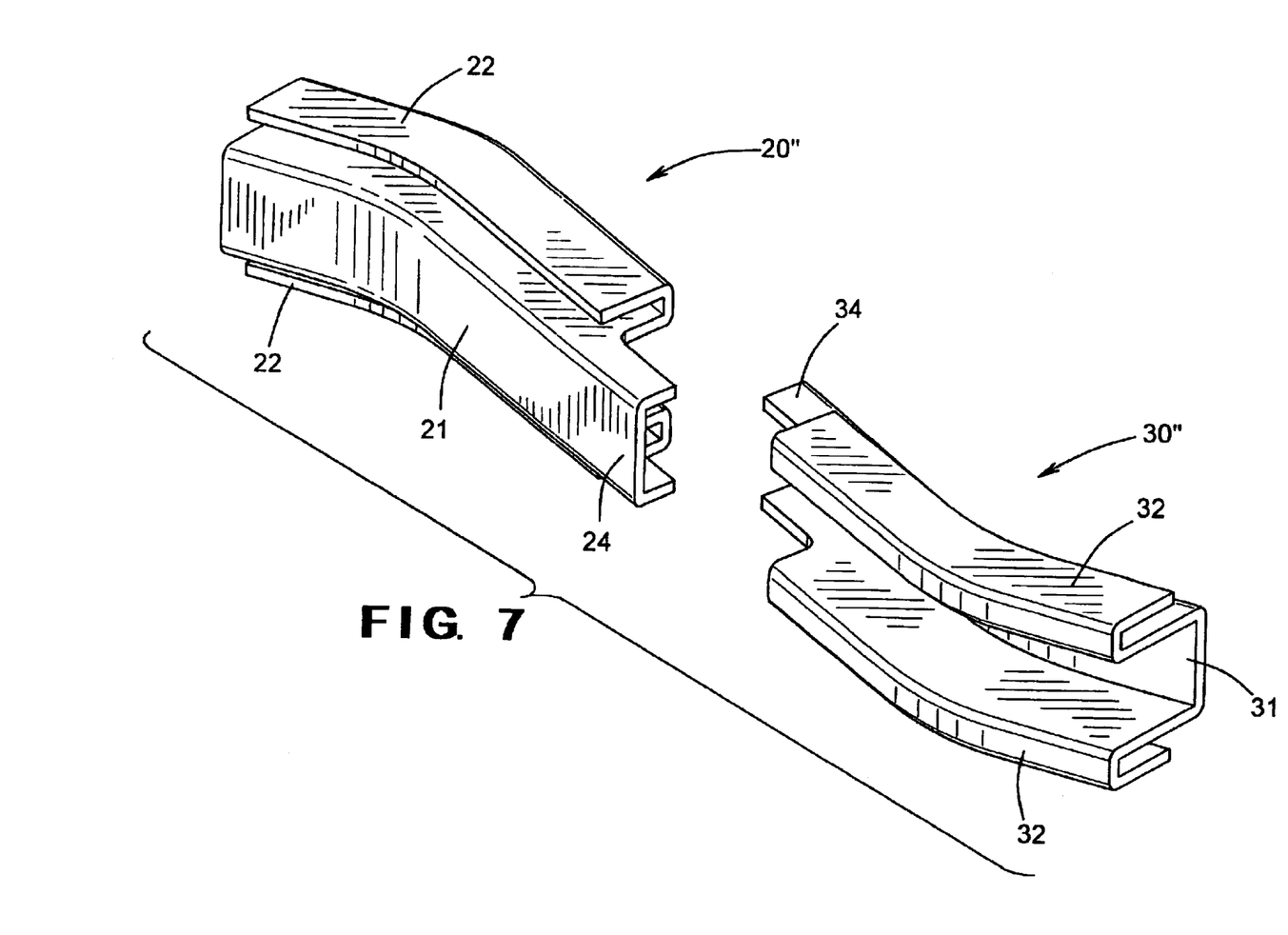
FIG. 7 is an enlarged exploded perspective view of the portion of a second embodiment of an internal reinforcing structure in accordance with this invention.

FIG. 7 illustrates a further alternative embodiment 20" and 30" for the structure of the first and second reinforcing structures 20 and 30 shown in FIGS. 2, 3, and 4. The further modified reinforcing structures 20" and 30" are, in large measure, similar to the reinforcing structures shown in FIGS. 2, 3, and 4, and like reference numbers are used to indicate similar structures. However, the further modified reinforcing structures 20" and 30" have respective tab portions 24 and 34 that extend longitudinally from the central web portions 2,1 and 31. The tab portion 24 of the first reinforcing structure 20" can abut the central web portion of the side rail section 11c, while the tab portion 34 of the second reinforcing structure 30" can abut the central web portion of the side rail section 11d. The tab portion 24 of the first reinforcing structure 20" longitudinally overlaps a portion of the second reinforcing structure 20", while the tab portion 34 of the second reinforcing structure 30" longitudinally overlaps a portion of the first reinforcing structure 30". Such longitudinal overlapping further increases the strength and rigidity of the side rail 11 throughout the longitudinal extent of both of the first and second reinforcing structures 20" and 30".

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A combined closed channel structural member and reinforcing structure for use in a vehicle body and frame assembly comprising:
   a closed channel structural member including a pair of opposed web portions extending between a pair of opposed flange portions; and
   a reinforcing structure disposed within said closed channel structural member, said reinforcing structure including a central reinforcing portion extending between a pair of base portions, said central reinforcing portion extending along one of said web portions of said closed channel structural member, said base portions respectively extending along and abutting said flange portions of said closed channel structural member.

2. The combined closed channel structural member and reinforcing structure defined in claim 1 wherein said central reinforcing portion is generally hat-shaped in cross sectional shape.

3. The combined closed channel structural member and reinforcing structure defined in claim 2 wherein said base portions are generally L-shaped in cross sectional shape.

4. The combined closed channel structural member and reinforcing structure defined in claim 1 wherein said central reinforcing portion is generally V-shaped in cross sectional shape.

5. The combined closed channel structural member and reinforcing structure defined in claim 1 wherein said closed channel structural member is formed from first and second sections, each having a generally C-shaped cross sectional shape that is defined by a central web portion extending between a pair of flange portions, said flange portions partially overlapping one another and being secured together to form said pair of opposed flange portions.

6. The combined closed channel structural member and reinforcing structure defined in claim 1 wherein said base portions of said reinforcing member terminate adjacent to ends of said flange portions of said closed channel structural member.

7. The combined closed channel structural member and reinforcing structure defined in claim 1 wherein said reinforcing member includes a tab that extends therefrom and abuts one of said web portions of said closed channel structural member.

8. The combined closed channel structural member and reinforcing structure defined in claim 1 wherein first and second reinforcing structures are disposed within said closed channel structural member.

9. The combined closed channel structural member and reinforcing structure defined in claim 8 wherein said first reinforcing members includes a tab that extends therefrom and abuts a first one of said web portions of said closed channel structural member, and wherein said second reinforcing members includes a tab that extends therefrom and abuts a, second one of said web portions of said closed channel structural member.

10. The combined closed channel structural member and reinforcing structure defined in claim 9 wherein said tabs longitudinally overlap one another.

11. A combined closed channel structural member and reinforcing structure for use in a vehicle body and frame assembly comprising:
   a closed channel structural member formed from first and second sections, each having a generally C-shaped cross sectional shape that is defined by a central web portion extending between a pair of flange portions, said flange portions partially overlapping one another and being secured together to form said pair of opposed flange portions, said flange portions of said first section being disposed within said flange portions of said second section; and
   a reinforcing structure disposed within said closed channel structural member, said reinforcing structure including a central reinforcing portion extending between a pair of base portions, said central reinforcing portion extending along said web portions of said first section, said base portions respectively abutting said flange portions of said first section.

12. The combined closed channel structural member and reinforcing structure defined in claim 11 wherein said central reinforcing portion is generally hat-shaped in cross sectional shape.

13. The combined closed channel structural member and reinforcing structure defined in claim 12 wherein said portions are generally L-shaped in cross sectional shape.

14. The combined closed channel structural member and reinforcing structure defined in claim 11 wherein said central reinforcing portion is generally V-shaped in cross sectional shape.

15. The combined closed channel structural member and reinforcing structure defined in claim 11 wherein said base portions of said reinforcing member terminate adjacent to ends of said flange portions of said closed channel structural member.

16. The combined closed channel structural member and reinforcing structure defined in claim 11 wherein said reinforcing member includes a tab that extends therefrom and abuts one of said web portions of said closed channel structural member.

17. The combined closed channel structural member and reinforcing structure defined in claim 11 wherein first and second reinforcing structures are disposed within said closed channel structural member.

18. The combined closed channel structural member and reinforcing structure defined in claim 17 wherein said first reinforcing members includes a tab that extends therefrom and abuts a first one of said web portions of said closed channel structural member, and wherein said second reinforcing members includes a tab that extends therefrom and abuts a second one of said web portions of said closed channel structural member.

19. The combined closed channel structural member and reinforcing structure defined in claim 18 wherein said tabs longitudinally overlap one another.

* * * * *